(12) United States Patent
Akiyama

(10) Patent No.: US 6,475,319 B1
(45) Date of Patent: Nov. 5, 2002

(54) MANUFACTURING SYSTEM FOR PNEUMATIC TIRES

(75) Inventor: Naruhiro Akiyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/431,086

(22) Filed: Nov. 1, 1999

(30) Foreign Application Priority Data

Oct. 30, 1998 (JP) .......................................... 10-310183

(51) Int. Cl.$^7$ ............................................... B29D 30/26
(52) U.S. Cl. .................... 156/111; 156/130.7; 156/132; 156/133; 156/135; 156/396; 156/398; 156/401; 156/406.2; 156/415
(58) Field of Search ................................ 156/111, 126, 156/130.7, 131, 132, 133, 135, 396, 398–403, 406.2, 414, 415, 416

(56) References Cited

U.S. PATENT DOCUMENTS

| | | | |
|---|---|---|---|
| 3,923,572 A | | 12/1975 | Garver |
| 4,325,764 A | * | 4/1982 | Appleby et al. ............. 156/398 |
| 4,468,267 A | * | 8/1984 | Irie ............................. 156/132 |
| 4,470,867 A | | 9/1984 | Caretta et al. |
| 5,225,028 A | * | 7/1993 | Bierens ....................... 156/401 |
| 5,273,612 A | | 12/1993 | Suetomi et al. |
| 5,380,384 A | | 1/1995 | Tokunaga et al. |

FOREIGN PATENT DOCUMENTS

| | | | |
|---|---|---|---|
| EP | 613767 A2 | | 9/1994 |
| JP | 57-212046 A | * | 12/1982 ................. 156/416 |
| JP | 6-254990 | | 9/1994 |

* cited by examiner

*Primary Examiner*—Geoffrey L. Knable
(74) *Attorney, Agent, or Firm*—Sughrue Mion, PLLC

(57) ABSTRACT

Method and apparatus for manufacturing pneumatic tires, wherein a green case comprised of at least one inner liner rubber member and a carcass ply member is formed on a first drum and transferred to a position around a second drum. The green case is the fixedly secured to the second drum by axially moving a pair of centering elements in opposite directions into pressure contact with opposite inner sides at the bead portions of the green case, and urging the inner peripheries of the bead portions by a pair of lock elements. The second drum is then caused to expand and undergo a width reduction, thereby expanding the green case into a toroidal shape. Sidewall rubber members, which have been previously wound on a pair of side bladders on the outer side of the lock elements, are expanded and reversed by inflating the side bladders and joined to the toroidal green case to thereby form a green tire.

18 Claims, 14 Drawing Sheets

FIG_3

FIG_10

FIG._11

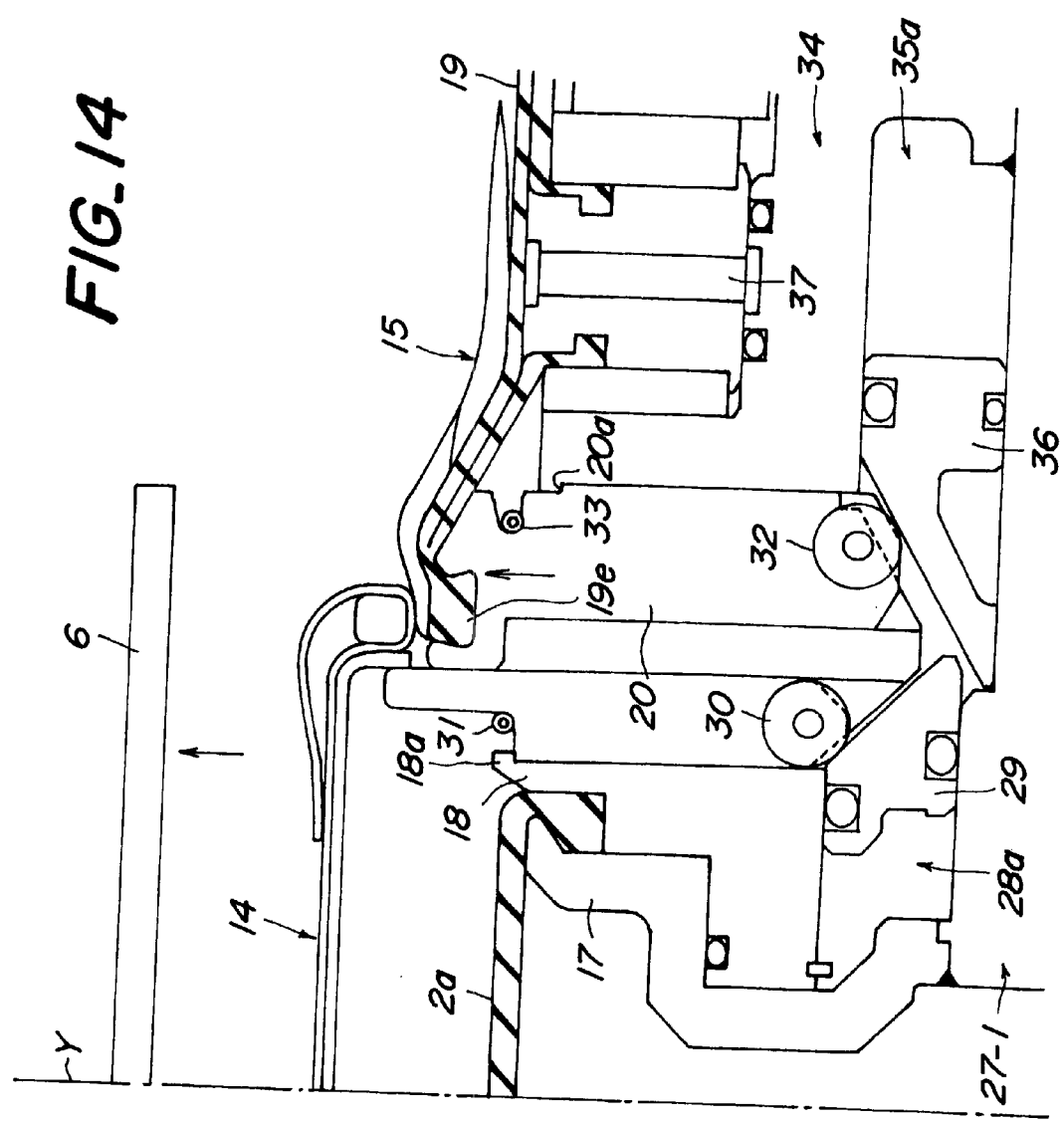

MANUFACTURING SYSTEM FOR PNEUMATIC TIRES

BACKGROUND OF THE INVENTION

1. Field of the Invention

The present invention relates to a manufacturing system for pneumatic tires and, in particular, to an improved method and apparatus for highly efficiently building green tires which are ready for vulcanization to produce radial tires.

2. Description of the Related Art

As known in the art, pneumatic radial tire includes reinforcement in the form of one or more belt members having a high tensile rigidity in their longitudinal directions. Thus, it has been a conventional practice to build green tires for pneumatic radial tires by a two-stage process as disclosed, for example, in U.S. Pat. No. 5,380,384 (or corresponding EP-613767B or JP-A-6-254990), the disclosure of which is hereby incorporated by reference.

In this instance, a green case comprising a carcass ply member and bead core members is formed on a first drum which is for the first building stage. A composite member, which comprises a belt member and a tread rubber member joined with each other, is separately formed and moved by a transfer ring onto the outer surface of the green case. The green case is then inflated into toroidal shape and thereby joined with the belt member. The green case joined with the composite member is held by the transfer ring and moved onto a second drum which is for the second building stage. The second drum comprises side bladders on which sidewall rubber members are wound, and which are inflated so as to urge the sidewall rubber members against the tread rubber member on both side edges thereof.

The above-mentioned known method proved to be particularly advantageous in that pneumatic tires can be manufactured with high productivity and at low cost. This is due to the fact that the work loads are assigned to the first and second stages in a well-balanced manner as to mitigate the difference in the cycle time for the two stages, and the green tires can be thus manufactured within a significantly reduced time. Nevertheless, it would be desirable to further develop the above-mentioned known method in various aspects, with an objective to achieve further improved productivity and cost reduction.

DISCLOSURE OF THE INVENTION

It is a primary object of the present invention to provide improved system for manufacturing pneumatic tires. The present invention ensures that existing manufacturing system can be utilized with minimized investment for the partial modification of the second drum, avoiding requirement for specifically designed arrangement to the extent possible. The system can be operated so as to improve the productivity of green tire building process by achieving well-balanced cycle time required for the first and second building stages while reducing the total cycle time, and to readily allow change in the specification of tires to be produced. The system is particularly suitable for manufacturing pneumatic tires with a higher product quality.

According to one aspect of the present invention, there is provided a method for manufacturing pneumatic tires comprising the steps of:

forming on a first drum a green case in which a carcass ply member and a pair of bead core members are joined together, and holding and moving the green case by a transfer device to a position around a second drum;

expanding a pair of centering elements radially outwards from the second drum and positioning the centering elements with reference to opposite inner sides of a pair of bead portions which are folded radially inwards around the bead core members of the green case held by the transfer device, and then moving the centering elements in opposite directions and thereby urging the centering elements against the opposite inner sides of the bead portions;

expanding a pair of lock elements on radially outer side of the centering elements and urging the lock elements against inner peripheral surfaces of the bead portions so as to fixedly secure the green case to the second drum;

subsequently releasing the green case from the transfer device;

causing the second drum to expand and undergo a width reduction, thereby expanding the green case into a toroidal shape; and joining sidewall rubber members to said toroidal green case to thereby form a green tire, said sidewall rubber members being wound on a pair of side bladders on the outer side of the lock and expanded and reversed by inflating said side bladders.

Advantageously, the second drum comprises an expandable center drum body having an adjustable width, wherein the pair of side bladders are situated adjacent to the drum body with the centering elements therebetween, and wherein the green case is held in place by accommodating the drum body and centering elements within the green case between the opposite inner sides of the bead portions. In this instance, it is preferred that the centering elements are radially expandable between the drum body and the respective side bladders, and axially movable in opposite directions, wherein the centering elements are expanded so that a clearance is always formed between radially outer most ends of the centering elements and an inner peripheral surface of the green case.

Advantageously, the side bladders have folded ends which are embedded in, and fixedly secured to the lock elements situated adjacent to the centering elements, wherein the sidewall rubber members are wound on the side bladders on the sides of the folded ends while the lock elements are in radially retracted positions.

It is preferred that a substantially constant length of said sidewall rubber members are automatically wound on said side bladders of the second drum during formation of a green case on the first drum, and the green case is transferred to the second drum by passing over the sidewall rubber members while the lock elements are in radially retracted positions.

It is also preferred that the sidewall rubber members are each wound on a smooth surface region and a rough surface region of the sidewall rubber.

Advantageously, those regions of the lock elements, which are urged against the inner peripheries of the bead portions of the green case, are aligned with the edges of the sidewall rubber members which are situated on the folded ends of the side bladders.

It is preferred that the side bladders each comprises a first side bladder section for winding the sidewall rubber member thereon, and a second side bladder section situated adjacent to the first side bladder section, wherein the first and second side bladder sections are sequentially inflated.

Advantageously, a composite member wherein the belt member and the tread rubber member are joined to each other is transferred to a position around the green case which has been fixedly secured to the second drum, and maintained centered with reference to the green case. The green case is then radially expanded and urged against, and thereby joined to the composite member, in such a manner that the side edges of the composite member are folded over, and tightly joined to the green case, and the sidewall rubber members are joined to side edges of the tread rubber member. In this instance, it is preferred that the composite member is formed during formation of the green case.

According to another aspect of the present invention, there is provided an apparatus for manufacturing pneumatic tires, comprising:

- a first drum for forming a green case in which a carcass ply member and a pair of bead core members are joined together;
- a second drum for forming a green tire in which the green case is joined to a belt member, a tread rubber member and sidewall rubber members;
- a transfer device for holding and moving the green case to a position around the second drum;
- a pair of centering elements which are expandable radially outwards from the second drum and adapted to be positioned with reference to opposite inner sides of a pair of bead portions which are folded radially inwards around bead core members of the green case held by the transfer device, and also adapted to be moved axially in opposite directions and thereby urged against the opposite inner sides of the bead portions;
- a pair of lock elements situated on radially outer side of the centering elements and adapted to be urged against inner peripheral surfaces of the bead portions so as to fixedly secure the green case to the second drum;
- means for causing the second drum to expand and undergo a width reduction after the green case has been released from the transfer device, thereby expanding the green case into a toroidal shape; and
- means for joining sidewall rubber members to said toroidal green case to thereby form a green tire, said sidewall rubber members being wound on a pair of side bladders on the outer side of the lock and expanded and reversed by inflating said side bladders.

Advantageously, the second drum comprises an expandable center drum body having an adjustable width, wherein the pair of side bladders are situated adjacent to said drum body with said centering elements therebetween, and wherein the green case is held in position by accommodating the drum body and centering elements within the green case between the opposite inner sides of the bead portions.

It is preferred that the centering elements are radially expandable between the drum body and the respective side bladders, and axially movable in opposite directions, wherein the centering elements are adapted to be expanded so that a clearance is always formed between radially outer most ends of the centering elements and an inner peripheral surface of the green case.

Advantageously, the side bladders have folded ends which are embedded in, and fixedly secured to the lock elements situated adjacent to the centering elements, wherein the sidewall rubber members are wound on the side bladders on the sides of the folded ends while the lock elements are in radially retracted positions.

It is preferred that the apparatus according to the present invention further comprises means for automatically winding a substantially constant length of the sidewall rubber members on the side bladders of the second drum during formation of a green case on the first drum, and wherein the transfer device is arranged such that the green case is transferred to the second drum by passing over the sidewall rubber members while the lock elements are in radially retracted positions.

It is also preferred that the sidewall rubbers are each wound on an outer surface of said side bladders which is comprised of a smooth surface region and a rough surface region.

Advantageously, those regions of the lock elements, which are urged against the inner peripheries of the bead portions of the green case, are aligned with the edges of the sidewall rubber members which are situated on the folded ends of the side bladders.

It is preferred that the side bladders each comprises a first side bladder section for winding the sidewall rubber member thereon, and a second side bladder section situated adjacent to the first side bladder section, wherein the first and second side bladder sections are sequentially inflatable.

Advantageously, the apparatus according to the present invention further comprises a belt/tread drum for forming a composite member in which the belt member and the tread rubber member are joined to each other to form a composite member; and a further transfer device for moving the composite member to a position around the green case which has been fixedly secured to the second drum, and holding the composite member centered with reference to the green case. The second drum is expandable so that the green case is radially expanded and urged against, and thereby joined to the composite member. The side edges of the composite member are subsequently folded over, and tightly joined to the green case. The side bladders are operable so that the sidewall rubber members are joined to the side edges of the tread rubber member. In this instance, it is preferred that the belt/tread drum is operable so that the composite member is formed during formation of the green case.

BRIEF DESCRIPTION OF THE DRAWINGS

The present invention will be further explained below with reference to a preferred embodiment shown in the accompanying drawings, in which:

FIGS. 13 and 14 are sectional views showing the second drum at the first and fourth building steps, respectively.

DETAILED DESCRIPTION OF THE INVENTION

Figure 1:
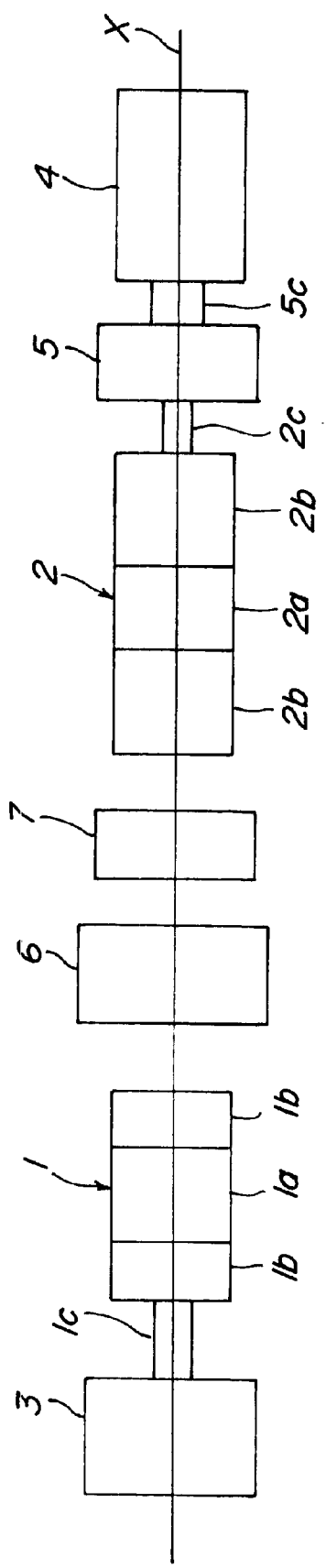
FIG. 1 is a schematic diagram showing the layout of a tire manufacturing system which is suitable for carrying out the method according to the present invention.

Referring now to FIG. 1, there is schematically shown a typical layout of tire manufacturing system which is suitable for carrying out the two-stage tire building method according to the present invention. The tire manufacturing system includes a first drum 1 for a first building stage, and a second drum 2 for a second building stage, which are aligned on a common axis X. The details of the first and second drums 1, 2 will be explained below.

The first drum 1 includes a center drum body 1a which can be radially expanded or retracted, and a pair of substantially cylindrical side bladders 1b, 1b on both sides of the center drum body 1a. The first drum 1 further includes a rotational shaft 1c which projects axially from a stand 3. Although not shown in the drawings, the shaft 1c is rotatably supported by a pair of bearings and adapted to be driven by an appropriate drive means, both of which are accommodated in the stand 3. It is further assumed that the width of the center drum portion 1a can be adjusted along with axial movements of the respective side bladders 1b, 1b.

Similarly, the second drum 2 includes a center drum body 2a which can be radially expanded or retracted, a pair of substantially cylindrical side bladders 2b, 2b on both sides of the center drum body 2a, and a rotational shaft 2c which is rotatably and drivingly supported by a stand 4. In the illustrated embodiment, a belt/tread drum (B/T drum) 5 is arranged between the second drum 2 and the stand 4. The B/T drum 5 serves to wind belt members and tread rubber member thereon to form a combined belt/tread member in a conventional manner, and has a hollow rotational shaft 5c which is supported by a pair of bearings (not shown) accommodated within the stand 4. The shaft 2c of the second drum 2 is coaxially passed through, and supported by the shaft 5c of the BIT drum 5. Appropriate driving means (not shown) are accommodated within the stand 4, and serve to drive the shafts 2c and 5c of the second drum 2 and the BIT drum 5 independently from each other.

There are further provided, between the first drum 1 and the second drum 2, a first transfer device 6 for holding and transferring a green case which has been formed on the first drum 1, and a second transfer device 7 for holding and transferring a combined belt/tread member which has been formed on the second drum 2. The B/T drum 5 and the first and second transfer devices 6, 7 are aligned on the above-mentioned common axis X. The B/T drum 5 is collapsible in the radial direction, while the first and second transfer devices 6, 7 can be radially expanded or retracted. The first transfer device 6 is arranged so that it can be moved axially between the first drum 1 and the second drum 2. The second transfer device 7 is arranged so that it can be moved between the position on that side of the second drum 2 which is opposite to the first drum 1, as illustrated in FIG. 1, and another position on that side of the second drum 2 which is remote from the first drum 1 and where the second transfer device 7 is situated adjacent to the B/T drum 5.

The first transfer device 6 is capable of holding the green case to be transferred while it is roughly centered with reference to the center drum body 2a of the second drum 2. On the other hand, the second transfer device 7 is capable of holding the combined belt/tread member which it is precisely centered with reference to the center drum body 2a of the second drum 2. Although not shown in FIG. 1, the first and second drums 1, 2 and the B/T drum 5 are supplied by appropriate servicers with rubber parts which are required for producing green tires. The production of a green tire with the above-mentioned system is performed typically by one-man operations.

Formation of a green case in the first building stage, i.e., on the first drum 1, will be explained below by referring to FIG. 2 taken in conjunction with FIG. 3. It is noted that the first building stage is to successively perform the following six representative steps which are schematically illustrated in respective frames $f_{11}$ to $f_{16}$ of FIG. 2.

Figure 2:
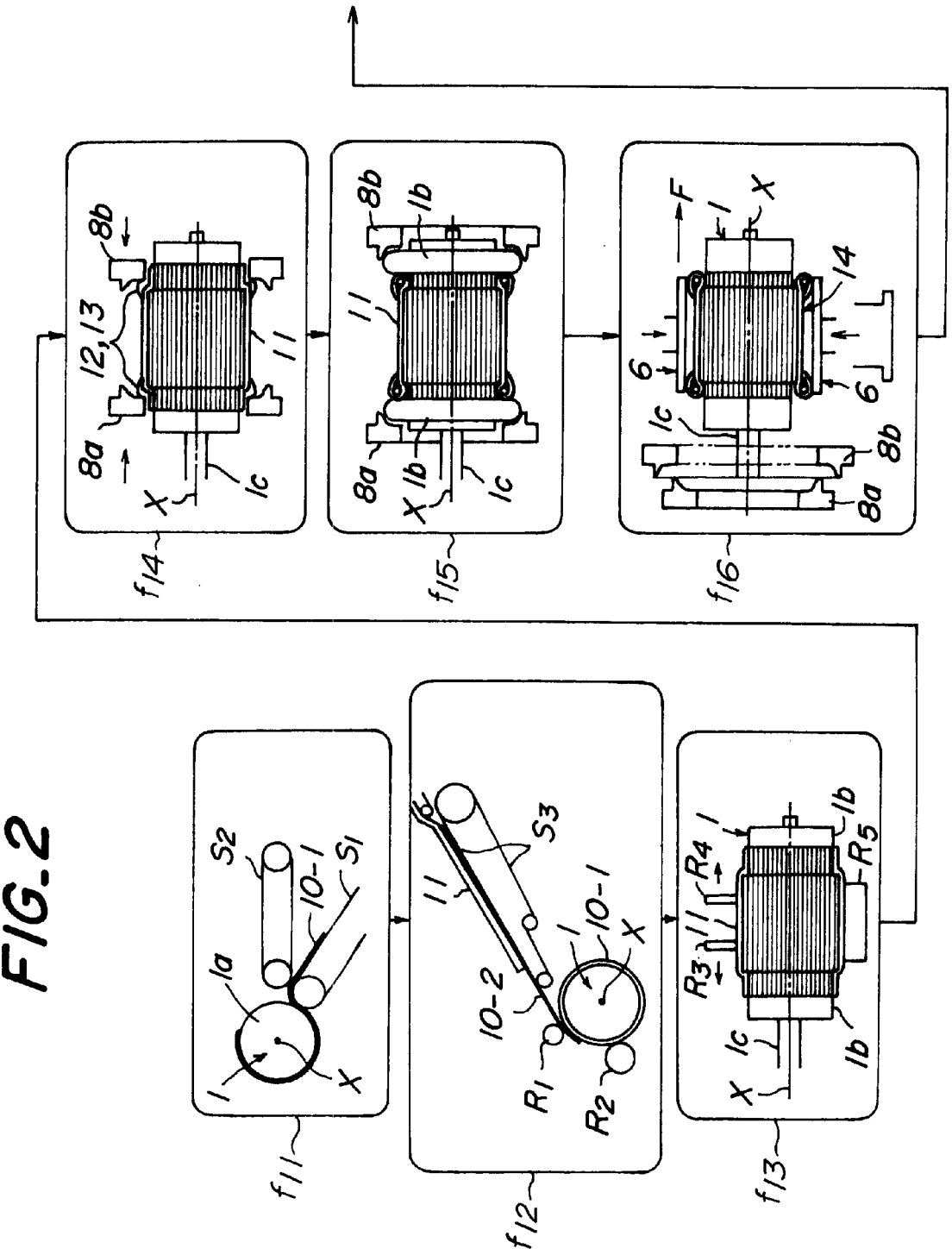
FIG. 2 is a schematic diagram showing the successive steps performed at the first building stage of green tires in the system of FIG. 1.

The first step of the first building stage is shown in the frame $f_{11}$ of FIG. 2, in which a first inner-liner rubber member 10-1 of a constant length clamped between a pair of servicers S1 and S2 is fed by the servicer S1 onto the center drum body 1a of the first drum 1, and wound thereon by a manual operation.

In the second step, as shown in the frame $f_{12}$ of FIG. 2, a second inner-liner rubber member 10-2 and a carcass ply member 11, both having a constant length and adhered to each other with a longitudinally stepped relationship, are fed onto the first inner-liner rubber member 10-1 on the first drum 1, and wound thereon by manual operation while being tightly urged against the first inner-liner rubber member 10-1 by pressure rollers $R_1$, $R_2$. In this instance, as shown in FIG. 3, it is assumed that the carcass ply member 11 has a width which is sufficient for bridging across the side bladders 1b, 1b on both sides of the center drum body 1a. It is further assumed that the first and second inner-liner rubber members 10-1, 10-2 are made of rubbers which are different from each other in terms of composition. The first and second inner-liner rubber members 10-1, 10-2 may be replaced by a single inner-liner rubber member 10, as shown by way of example in FIG. 3, with the above-mentioned first step omitted.

After the winding of the carcass ply member 11 has been completed, the third step as shown in the frame $f_{13}$ of FIG. 2 is performed automatically wherein the center drum body 1a of the first drum 1 is expanded radially outwards so that steps are formed between the center drum body 1 a and the side bladders 1b, 1b. A pair of pressure rollers $R_4$, $R_5$, which can be moved axially in opposite directions, and/or a relatively wide pressure roller $R_5$ are urged against the outer surface of the carcass ply member 11 and operated so as to evacuate air remaining between the inner liner rubber members 10-1, 10-2 and the carcass ply member 11, and tightly join these rubber members to each other.

Subsequently, the fourth step as shown in the frame $F_{14}$ of FIG. 2 is performed wherein bead filler rubber members 12 and corresponding bead core members 13, which are combined with each other, are manually applied onto respective bead core setter rings 8a, 8b. Then, the bead core setter rings 8a, 8b are moved axially toward each other so that the bead core members 13 are set onto the carcass ply member 11 at its regions corresponding to the steps between the center drum body 1a and the side bladders 1b, 1b.

The bead core setter rings 8a, 8b are then temporarily moved axially away from each other and returned to their initial positions. Then, the fifth step as shown in the frame $f_{15}$ of FIG. 2 is performed wherein the side bladders 1b, 1b on both sides of the center drum body 1a are filled with pressurized gas, which is typically pressurized air, and thereby caused to expand. It is assumed that each bead core setter ring 8a, 8b has tapered inner surface which is engageable with the corresponding side bladder 1b, 1b. The bead core setter rings 8a, 8b in their initial positions are moved axially toward each other once again, so that the expanded side bladders 1b, 1b are engaged by the tapered inner surfaces of the bead core setter rings 8a, 8b and moved toward the widthwise center region of the center drum body 1a. As a result, those portions of the carcass ply member 11, which are situated on the side bladders 1b, 1b are folded around the respective bead core members 13, along with the bead filler rubbers 12. The pressurized gas is then discharged from the side bladders 1b, 1b, so that the side bladders 1b, 1b are restored into their initial cylindrical shape.

Figure 3:
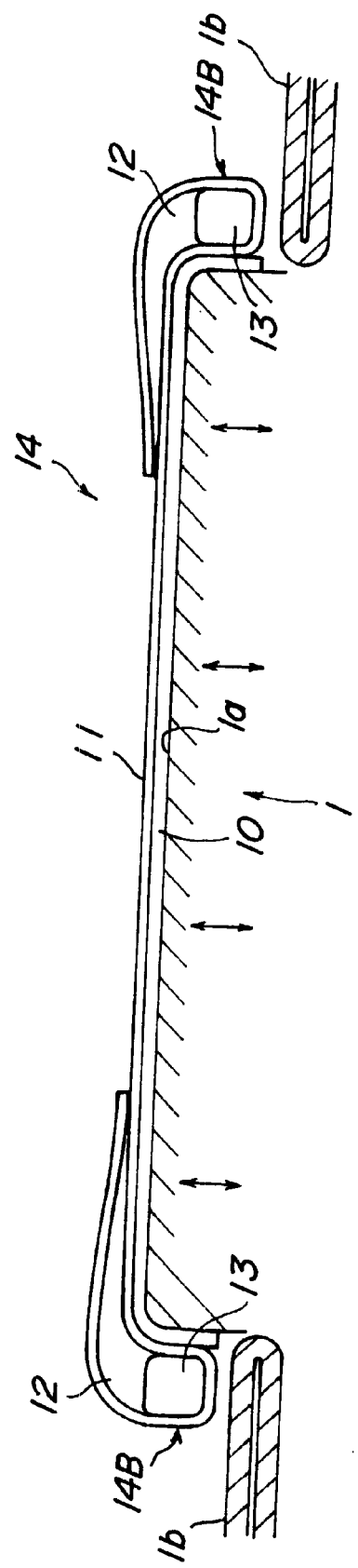
FIG. 3 is a sectional view of a green case which has been built on the first drum in the first building stage.

Formation of a green case 14 on the first drum 1 is now completed wherein, as shown in FIG. 3, the inner liner rubber members 10-1, 10-2, the carcass ply member 11, the bead filler rubber members 12 and the bead core members 13 have been assembled as explained above. The green case 14 has a substantially cylindrical shape, and includes bead core members 13 which are situated at the stepped regions of the carcass ply member 11. The bead portions 14B extending around the bead core members 13 are folded to extend radially outwards and then axially inwards. If necessary, a rubber chafer may be previously arranged between the end of the inner-liner rubber member 10 and the carcass ply member 11. In this instance, the rubber chafer is folded around the bead core member together with the carcass ply member.

After formation of a green case 14 has been completed, the sixth step as shown in the frame $f_{16}$ of FIG. 2 is performed in which the bead setter rings 8*a*, 8*b* are moved axially in a direction opposite to the direction indicated by arrow F in which the green case 14 is to be removed. It is assumed that the bead setter ring 8*b* is radially expandable, and is axially moved in its expanded state. The first transfer device 6 for the green case shown in FIG. 1 is axially moved toward the widthwise center position of the first drum 1, and is then radially retracted to clamp and hold the green case 14 on the first drum 1.

Figure 4:
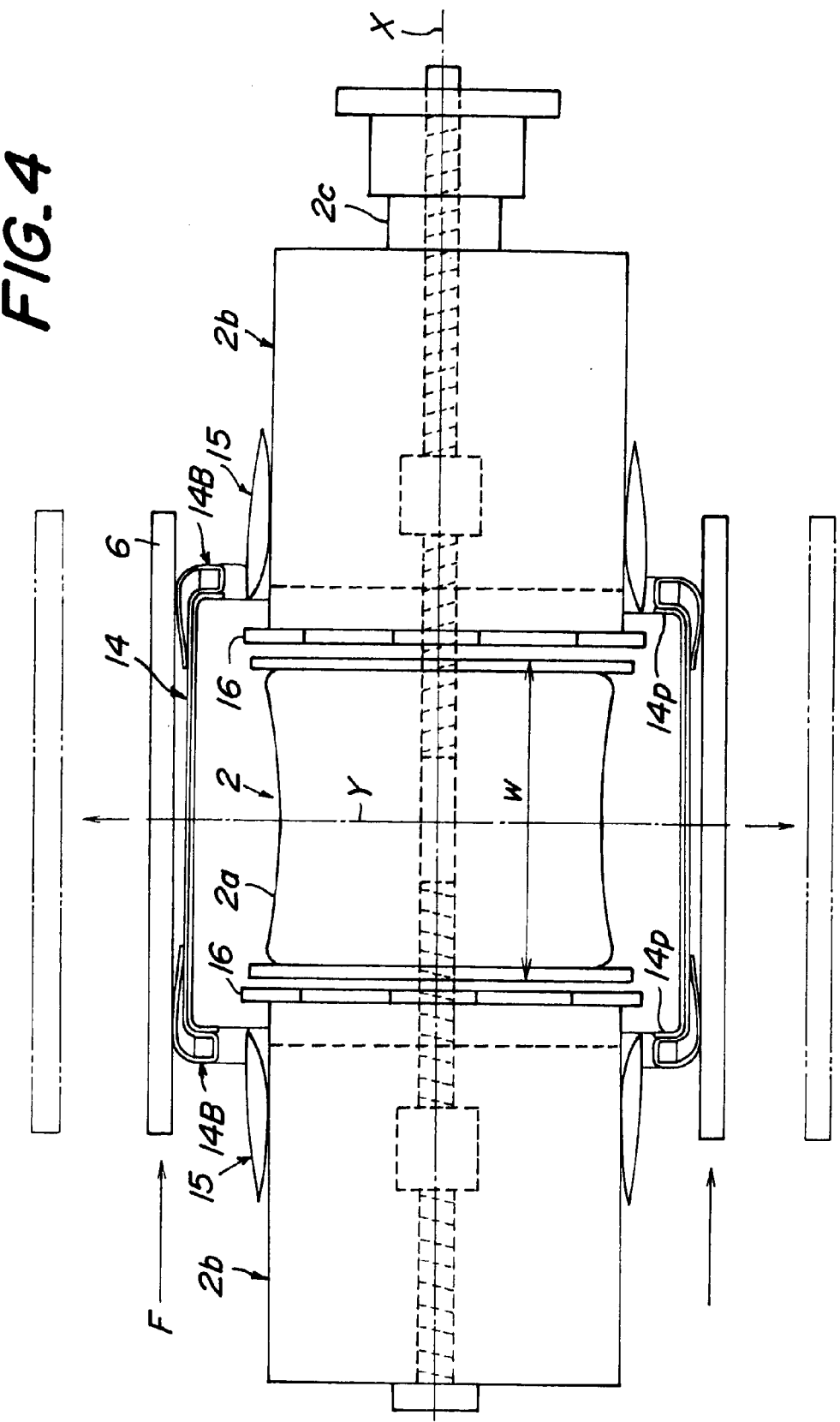
FIG. 4 is a side view showing a second drum and a green case held on the second drum.
Figure 5:
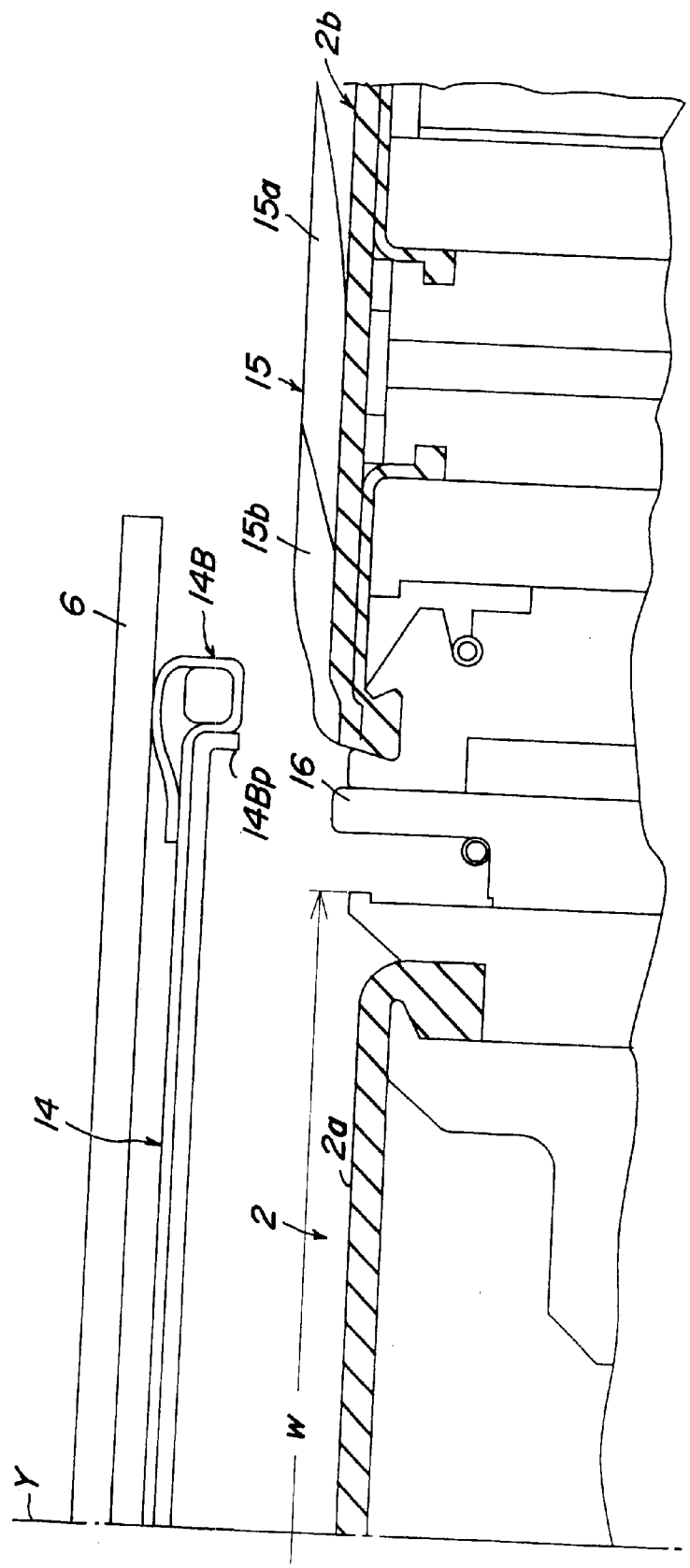
FIGS. 5 to 8 are side views showing the right halves of the second drum and the green case at the first, second, third and fourth building steps, respectively.

After the green case 14 has been clamped and held by the transfer device 6, the first drum is radially retracted so that the diameter of the center drum body 1*a* becomes smaller than the inner diameter at the bead portion 14B of the green case 14. The transfer device 6 is then axially moved in the direction indicated by arrow F, thereby completing the first stage of the tire building process. The green case 14 clamped and held by the transfer device 6 is further moved axially to a position corresponding to the center drum body 2*a* of the second drum 2, as shown in FIGS. 4 and 5.

The particulars of the second stage of the tire building stage will be explained below. As shown in FIGS. 4 and 5, the second drum 2 is symmetrical with reference to a center plane which includes the widthwise center Y of the drum body 2*a*. The position of the transfer device 6 is controlled by appropriate controller, so that the widthwise center of the green case 14 is aligned with the center plane of the drum body 2*a*. It is assumed that, within the period between the starting of the formation of green case 14 and the completion of transfer of the green case 14 from the first drum 1 to the second drum 2, sidewall rubber members 15 of a constant length are wound on predetermined regions at the outer surfaces of the side bladders 2*b*, 2*b* and the leading and trailing ends of the sidewall rubber members 15 are joined together. This operation may be carried out automatically, for example, by using appropriate actuators or robots. Each sidewall rubber member 15 in the illustrated embodiment includes a sidewall rubber member 15*a* and a rubber chafer member 15*b* which are integral with each other.

The width W of the center drum body 2*a* is adjusted in advance to ensure that, when the green case 14 is held around the second drum 2, a pair of centering elements 16 on both side of the center drum body 2*a* are axially spaced from opposite inner surfaces 14B*p* of the bead portions 14B. It is also important to adjust the outer dimensions of the second drum 2 to ensure that, even when the sidewall rubber members 15 have been wound on the side bladders 2*b*, the green case 14 can be moved to the position around the second drum with sufficient radial clearance.

Figure 6:
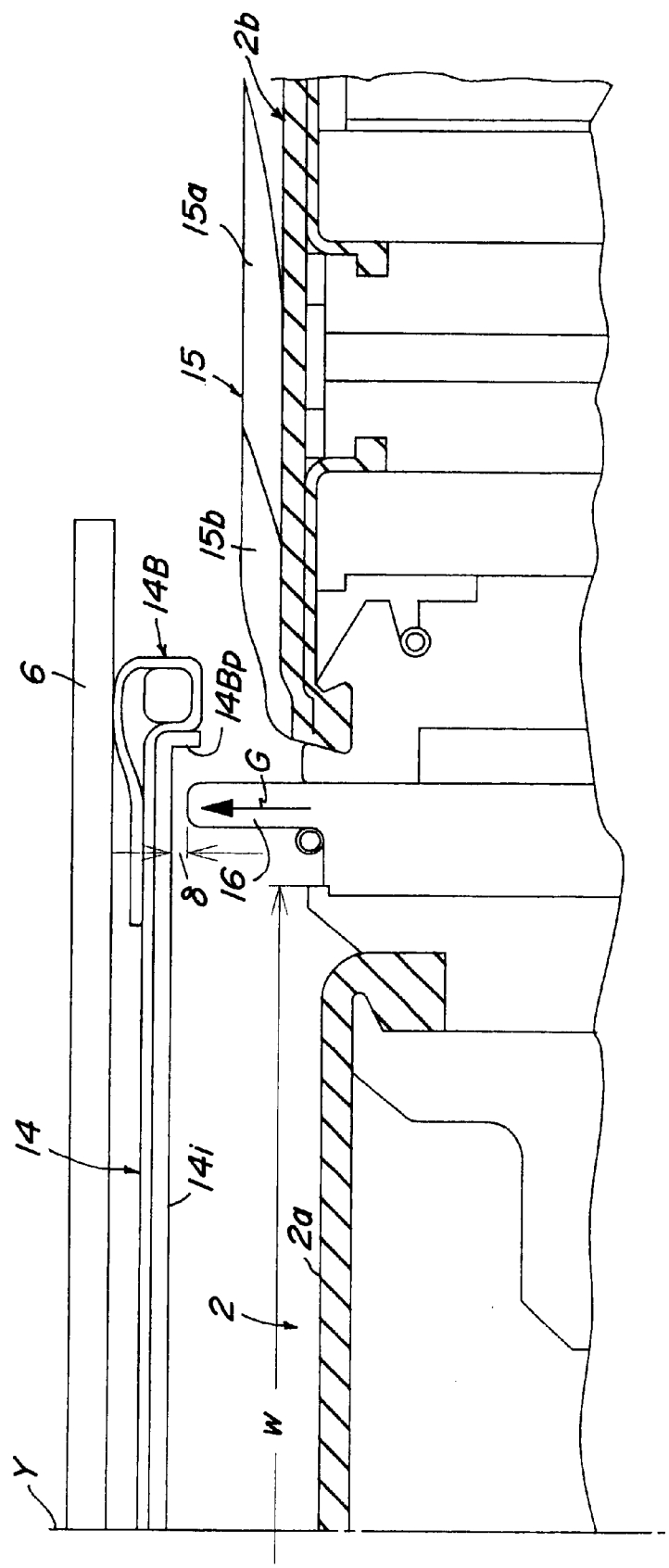

Subsequently, as shown in FIG. 6, the centering elements 16 are expanded radially outwards, i.e., in the direction indicated by arrow G. In the expanded state of the centering elements 16, a clearance δ is formed between the inner peripheral surface 14*i* of the green case 14 and the outer peripheral surfaces of the centering elements 16 having the maximum outer diameter. The clearance is on the order of 2 to 4 mm, and is made uniform between the centering element 16 in the illustrated position and the opposite inner surface 14B*p* of the corresponding bead portion 14B. Various types of centering elements 16 may be used provided that they can be radially expanded and retracted. In the illustrated embodiment, the centering element 16 comprises a plurality of radial segments to be more fully described hereinafter.

Figure 7:
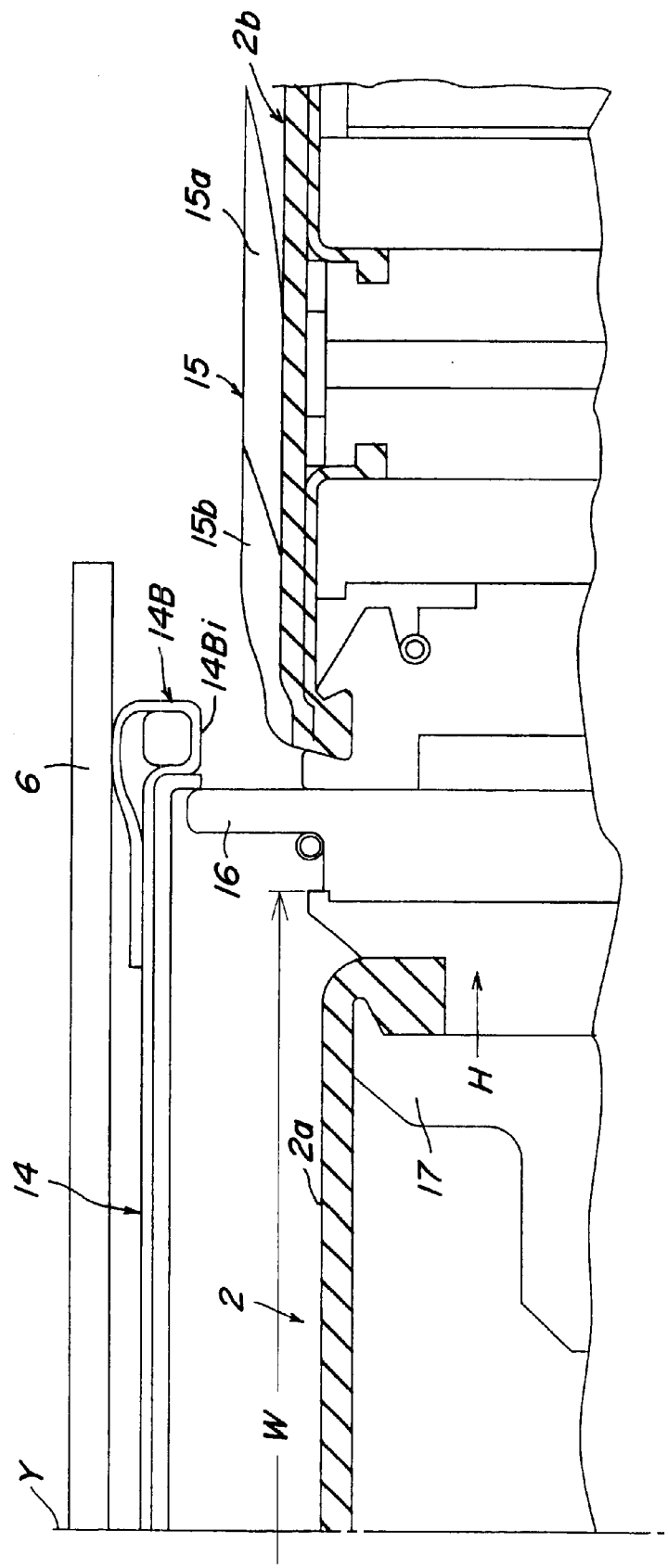

Both end portions of the center drum body 2*a* of the second drum 2 are axially moved in directions away from the center plane, as indicated by arrow H in FIG. 7, to increase the width of the center drum body 2*a* from the initial width w as shown in FIG. 6 to the increased width W as shown in FIG. 7. To this end, it is preferred that each end portion of the center drum body 2*a* are clamped between an inner ring 17 and an outer ring 18, which can be moved axially in the manner to be more fully described hereinafter.

The axial movement of the outer ring 18 causes the adjacent centering element 16 to move axially as indicated by arrow H, while urging the radial end portion of the centering ring 16 against the opposite inner surface 14B*p* at the bead portion 14B of the green case 14, and thereby achieving a precise centering of the green case 14 relative to the center drum body 2*a*. The center drum body 2*a* may comprise a resilient material, such as vulcanized rubber, in order that it can be expanded or retracted in the axial directions. In order to ensure that the centering element 16 exerts to the green case 14 an optimum pressure within a prescribed range, the amount of movement of the inner ring 17 is determined in view of the distance between the opposite inner surfaces 14B*p* of the bead portions 14, and also in view of the initial positions of the centering elements 16.

Figure 8:
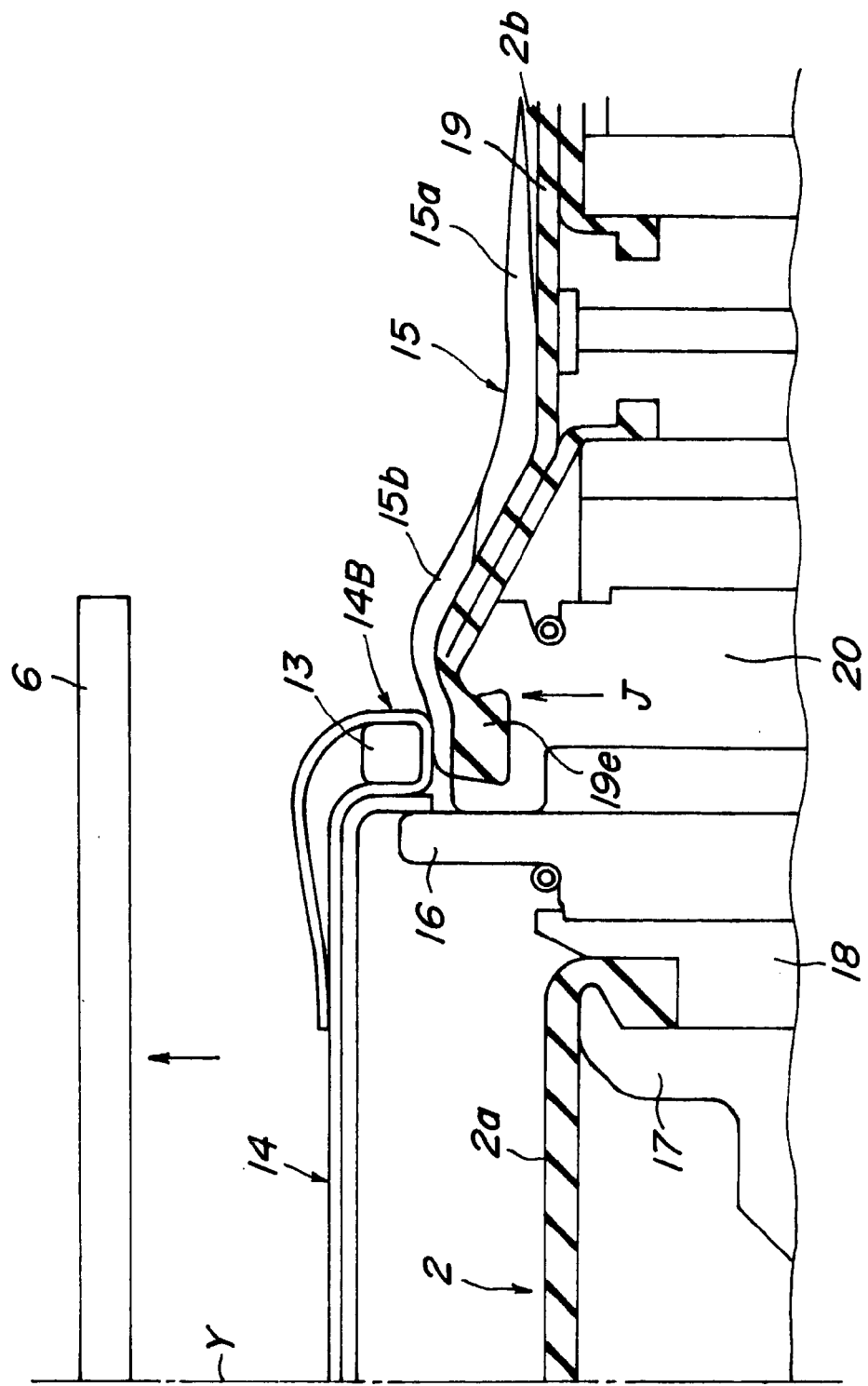

Subsequently, the green case 14 as being maintained centered by the centering elements 16 is firmly secured to the second drum 2, as shown in FIG. 8. To this end, lock elements 20 are arranged on the axially outer side of the respective centering elements 16, and are expanded radially outwards, as indicated by arrow J in FIG. 8, and urged against the inner peripheral regions of the bead portions 14B. It is assumed that each side bladder 2*b* includes an outer side bladder section 19 having a folded axial end 19*e* which is situated close to the center drum body 2*a* and which is clamped by the lock element 20.

In this instance, it is preferred that the folded axial end 19*e* of the outer side bladder section 19 is clamped at a location on the lock element 20 where it is situated opposite to the inner peripheral surface of the bead portion 14, and further that the end of the rubber chafer member 15*b* is arranged on the folded axial end 19*e* of the outer side bladder section 19. Such an arrangement is particularly advantageous where the rubber chafer members 15*b* are joined to the green case 14 in the second stage, as in the illustrated embodiment, since the rubber chafer member 15*b* can be firmly joined to the optimum location at the inner peripheral surface of the bead portion 14B automatically.

It is also preferred that, in the region of the side bladder section 19 on which the sidewall rubber member 15 is wound, the outer side bladder section 19 has a smooth or mirror-finished outer surface at its circumferential region which corresponds at least partly to the width of the sidewall rubber member 15. By this, it is possible to enhance the adhesion of the sidewall rubber member 15 to the outer side bladder 19, and thereby ensure that the sidewall rubber member 15 can be positively joined to the desired location and maintained in the proper position on the outer side bladder section 19 throughout the successive building steps to be performed.

In the manner described above, the green case 14 is firmly secured to the predetermined location of the second drum 2 by the centering element 16 which is urged axially against the opposite inner side surface 14B$p$ of the bead portion 14B, and also by the lock element 20 which is urged radially against the inner peripheral surface of the bead portion 14B. After the green case 14 has been secured to the second drum 2, the transfer device 6 is expanded radially outwards as shown by respective arrows in FIGS. 4 and 8, and then returned to the waiting position as shown in FIG. 1.

Various types of lock elements 20 may be used provided that they can be radially expanded and retracted. In the illustrated embodiment, the lock element 16 comprises a plurality of radial segments to be more fully described hereinafter.

The successive steps in the second stage of tire building process are performed automatically, without manual operations. In order to minimize the cycle time required for producing a green tire, the operator begins formation of a composite member as soon as the manual operations for the first stage have been completed, in which the belt member and the tread rubber member are successively placed on the B/T drum 5 (FIG. 1). Such formation is completed before the transfer device 6 for the green case is returned from the second drum 2 when the transfer device 7 for the composite member has already moved to a position around the B/T drum 5 to hold the composite member, in order that the transfer device 7 does not inhibit the returning movement of the transfer device 6.

Figure 9:
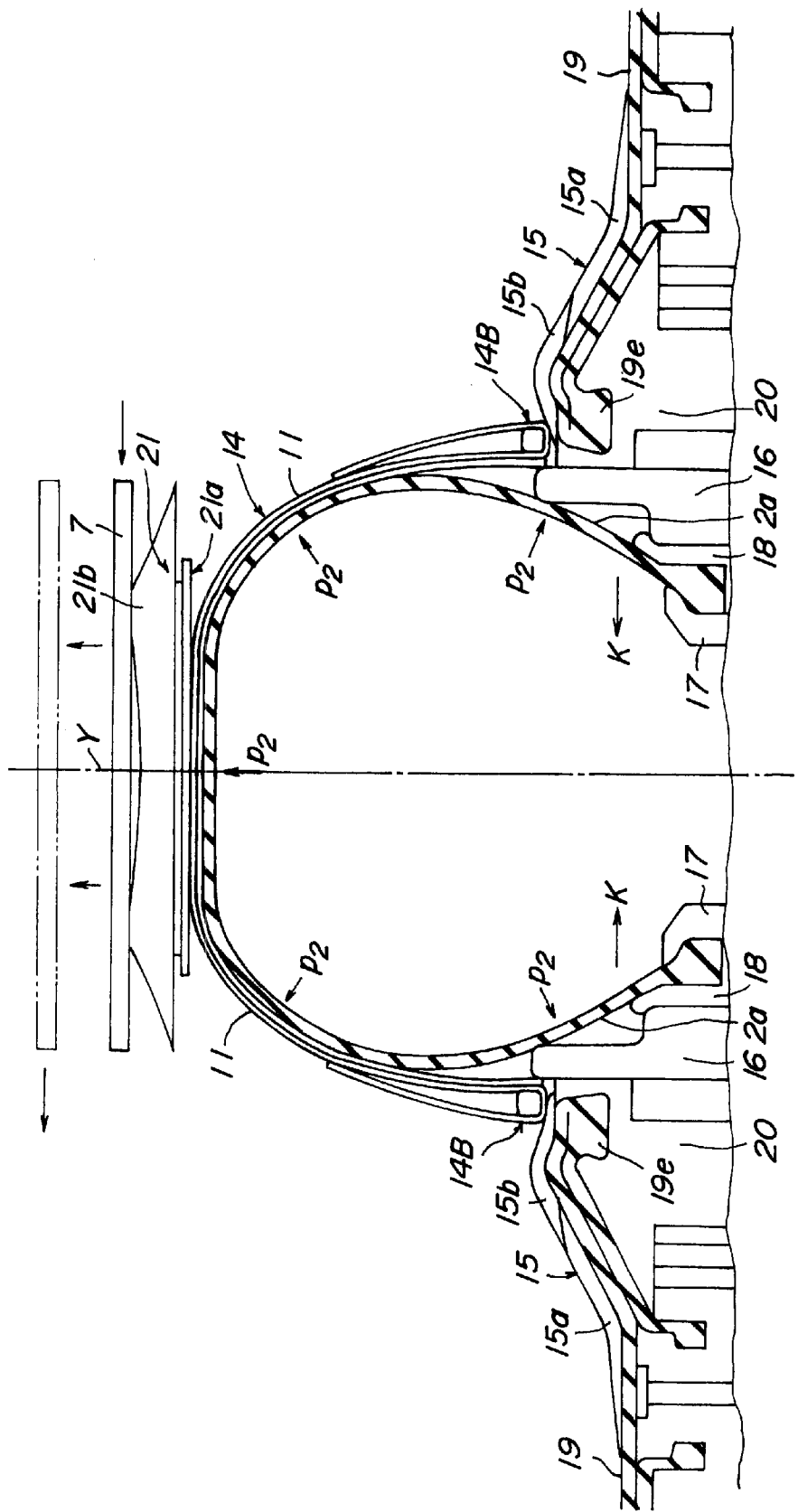
FIGS. 9 to 11 are side views showing the second drum and the green case at the fifth, sixth and seventh building steps, respectively.
Figure 10:
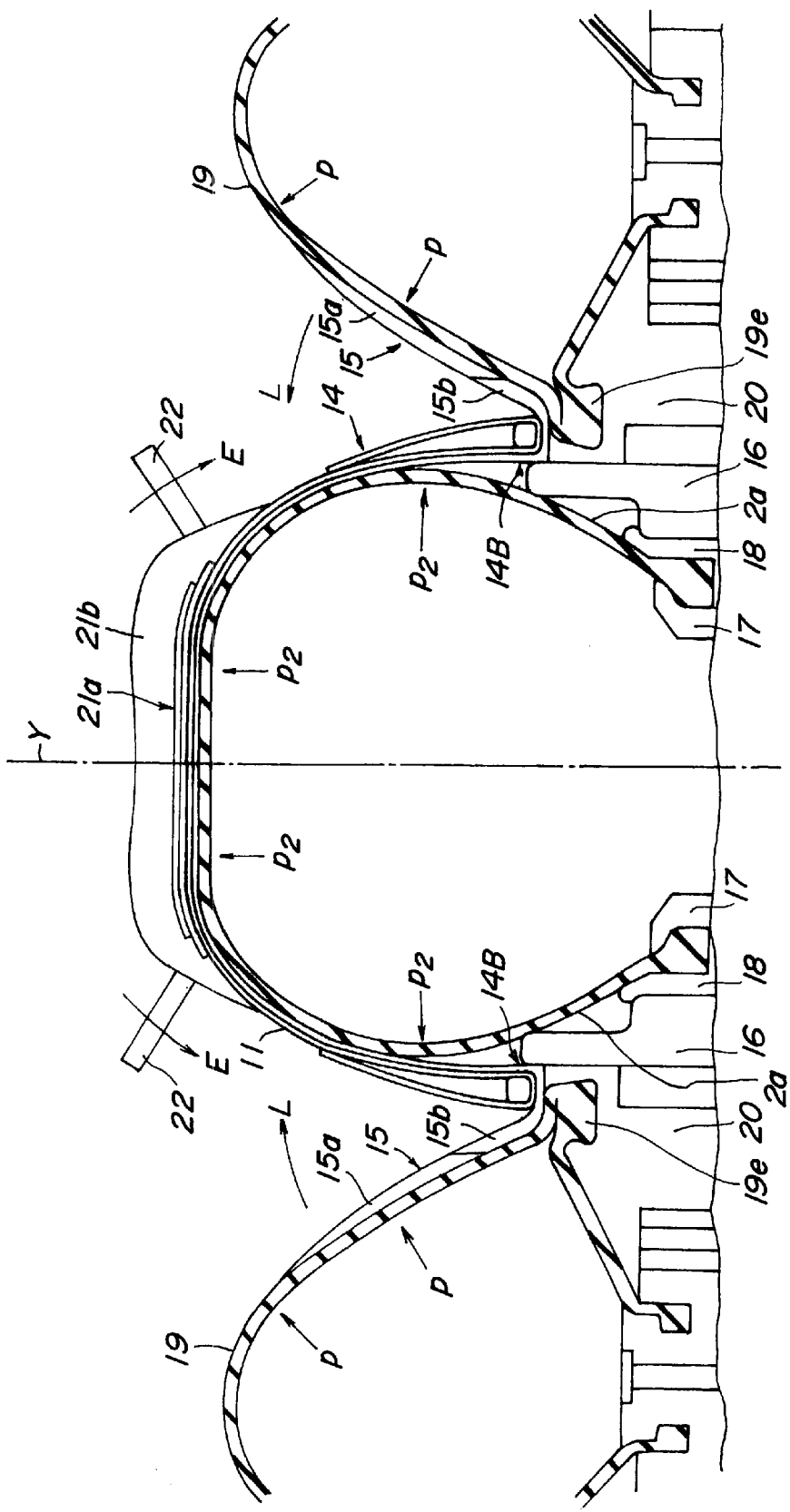
Figure 11:
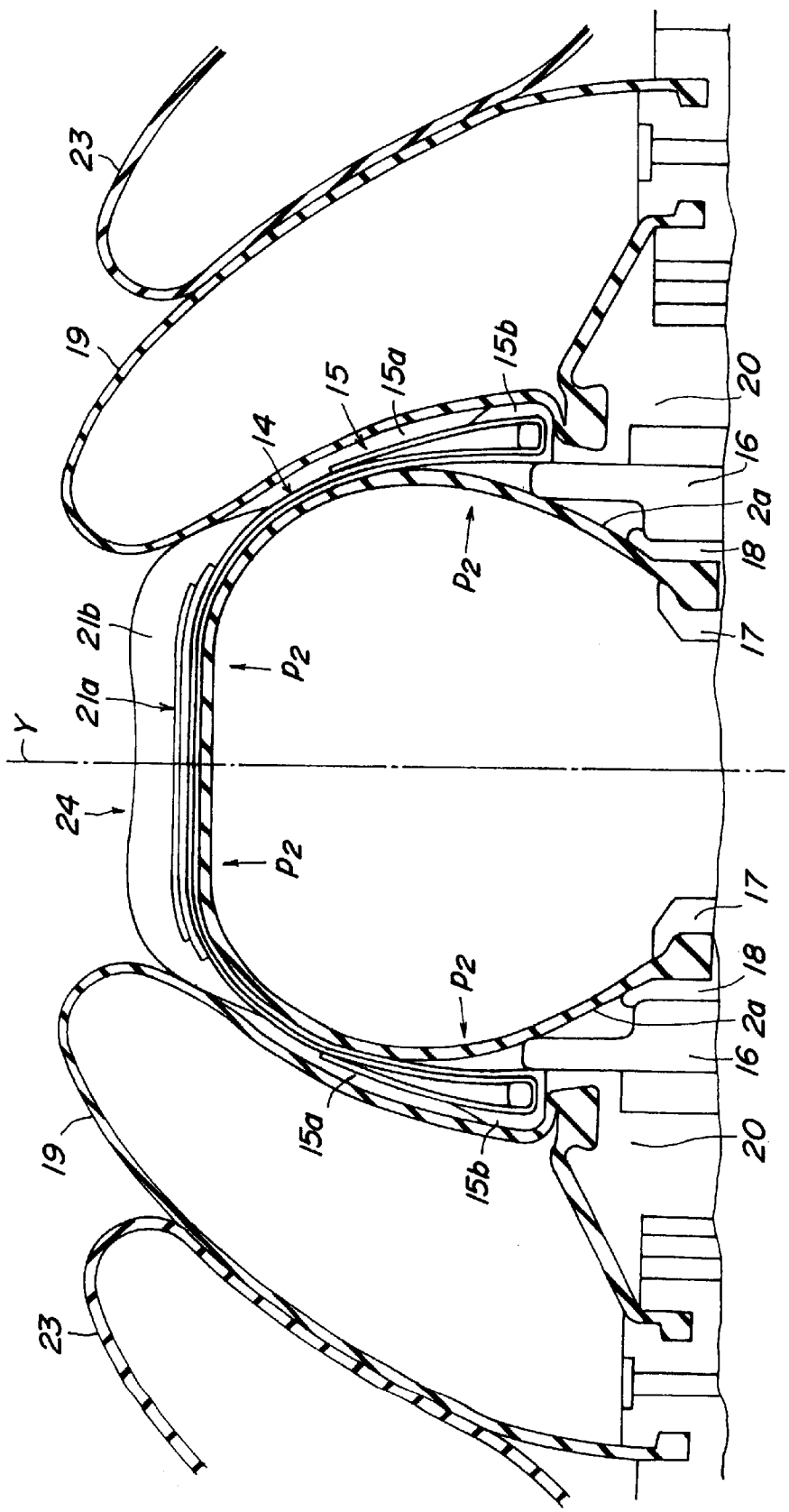

With reference to FIGS. 9–11, as soon as the transfer device 6 for the green case 14 has moved from the second drum 2, the B/T drum 5 is radially retracted and the composite member 21 is axially moved toward the second drum 2. The composite member 21 in the illustrated embodiment comprises a belt member 21$a$ and a tread rubber member 21$b$, wherein the belt member is formed of two steel cord layers 21$a$. The composite member 21 and, in particular, the belt member 21$a$ is precisely positioned in its width direction with reference to the center plane of the second drum 2, which includes the center line Y. Such a positioning can be achieved by appropriate centering controller, not shown. At the same time, starting from the width W shown in FIG. 8, the width of the center drum body 2$a$ is decreased as shown by arrows K in FIG. 9, while a pressurized gas under a relative high pressure, e.g., at 1.0 kgf/cm$^2$, is supplied into the center drum body 2$a$ to cause inflation thereof.

The green case 14 which is firmly secured to the center drum body 2$a$ at the bead portions 14B is caused to inflate together with the center drum body 2$a$. The inflation of the center drum body 2$a$ and the green case 14, in turn, causes the width of the center drum body 2$a$ to be reduced until the outer surface of the carcass ply member 11 of the green case 14 is brought into contact with, and adhered to the inner surface of the belt member 21$a$ of the composite member 21 with a sufficient width. After the composite member 21 has been adhered to the green case 14, the transfer device 7 is expanded radially outwards to assume the position shown by imaginary line, while being disengaged from the composite member 21, and is then axially moved and returned to the waiting position shown in FIG. 1.

Subsequently, as shown in FIG. 10, the side edges of the composite member 21 are folded as shown by arrows E, so that they are brought into contact and adhesion with the outer surface of the carcass ply member 11 of the green case 14. The folding and adhesion of the side edges of the composite member 21 may be achieved by any appropriate means. In the case of the illustrated embodiment, a pair of pressure rollers 22 are used for this purpose, which are rotatable about their own axes and movable toward the green case 14.

After the composite member 21 has been folded and adhered to the green case 14, the side bladder sections 19 are supplied with pressurized gas under pressure p and are thereby inflated. As a result, the sidewall rubber members 15 wound on the side bladder sections 19 are expanded and deformed into substantially truncated-conical shape, and moved in respective directions indicated by arrows L. On this occasion, in order to achieve positive and accurate movement of the sidewall rubber members 15, it is preferred that the end of the sidewall rubber member 15 and, in particular, the end of the rubber chafer member 15$b$ is clamped between the inner periphery of the bead portion 14B and the folded end 19$e$ of the side bladder section 19.

As shown in FIG. 11, it is assumed that each side bladder 2$b$ is of double-bladder type wherein a further side bladder section 23 is arranged adjacent to the above-mentioned side bladder section 19. These side bladder sections 23 are also supplied with pressurized gas under pressure p and are thereby inflated. As a result, the side bladder sections 19 are urged by the respective side bladder sections 23 against the green case 14 to which the belt member 21$a$ and the tread rubber member 21$b$ have already been joined, so that the sidewall rubber members 15 are joined onto the outer surfaces of the green case 14 and the tread rubber member 21$b$ on their side edges.

On this occasion, since the sidewall rubber member 15 is partly joined to the smooth surface region of the side bladder section 19 with a sufficient adhesion force, the sidewall rubber member 15 can bee accurately joined to the green case 14 and the tread rubber member 21$b$. On the other hand, the remaining surface region of the side bladder section 19 on which the sidewall rubber members 15 is wound and which is not smooth has a roughness such that the sidewall rubber member 15 can be readily removed from the side bladder section 19 when it has been joined to the green case 14 and the tread rubber member 21$b$. The width of the smooth surface region of the side bladder section 19 is determined in view of the required adhesion force with which the sidewall rubber member 15 is maintained in position, and the required separability of the sidewall rubber member 15 from the side bladder section 19.

After the sidewall rubber members 15 have been joined to the green case 14 and the tread rubber member 21$b$, the pressurized gas in the side bladder sections 19, 23 is exhausted so that they are returned to their initial cylindrical shapes. The pressure rollers 22 are operated, if necessary, to firmly join the sidewall rubber members 15 to the green case 14 and the tread rubber member 21$b$, and thereby form a green tire 24.

Subsequently, the transfer device 7 (FIG. 1) in its expanded state is moved to a position around the green tire 24 and then retracted radially inwards to hold the green tire 24. The pressurized gas is exhausted from the center drum body 2$a$ and the centering element 16 and the lock element 20 are retracted radially inwards. The transfer device 7 is then operated to remove the green tire 24 from the second drum 2 to complete the building process of a green tire 24 which is to be subjected to vulcanization in a conventional manner, to form a product tire.

In the green tire building process as explained above, it is possible to significantly reduce the cycle time required for the first building stage, since the operations which must be performed manually in the first building stage are only the windings of the inner liner rubber members 10 and the carcass ply member 11 on the first drum 1, and the remaining operations in the first building stage are performed automatically. The operator is capable of fully utilizing the spare time to form a composite member 21 by winding a plurality of cord layers on the B/T drum to form a belt member 21a, and joining a tread rubber member 21b onto the belt member 21a.

In the period until formation of a composite member 21 is completed, the green case 14 is moved onto the second drum 2 as shown in FIG. 4, the successive operations as shown in FIGS. 5 to 8 are performed automatically, and the transfer device 6 is returned to the initial position. The composite member 21 is now moved to the position shown in FIG. 9, and the successive operations as shown in FIGS. 9 to 11 are then performed automatically. During the period in which the operations of FIGS. 9 to 11 are performed, the operator is capable of performing the manual operations for the building of a next green case 14.

It is noted that, after the carcass ply member 11 has been wound onto the first drum, all the operations including removal of the green case 14 from the first drum and transfer of the green case 14 to the second drum are automatically performed by the transfer device 6, and all the operations for the second building stage are also performed automatically. The control required for such automatic operations may be started simply by manually pushing a starting switch into ON position, and an elaborated or expensive automatic control is not necessary.

It can be appreciated that present invention makes it possible to produce a green tire with a significantly improved productivity and within a minimized cycle time. This is due to the fact that the cycle time required for the first building stage which is free from joining of the sidewall rubber members is substantially the same as the cycle time required for the second building stage, and the operator has a sufficient time to complete formation of a composite member 21, which is required for the second building stage, within the period in which automatic operations in the first building stage are performed.

The present invention makes it possible readily to change the specification of tires to be produced, provided that the rim size is the same, which also contributes to provide an improved productivity. Moreover, the method according to the present invention can be carried out by using existing manufacturing system of which the second drum is partly modified, thereby minimizing the required investment.

Figure 12:
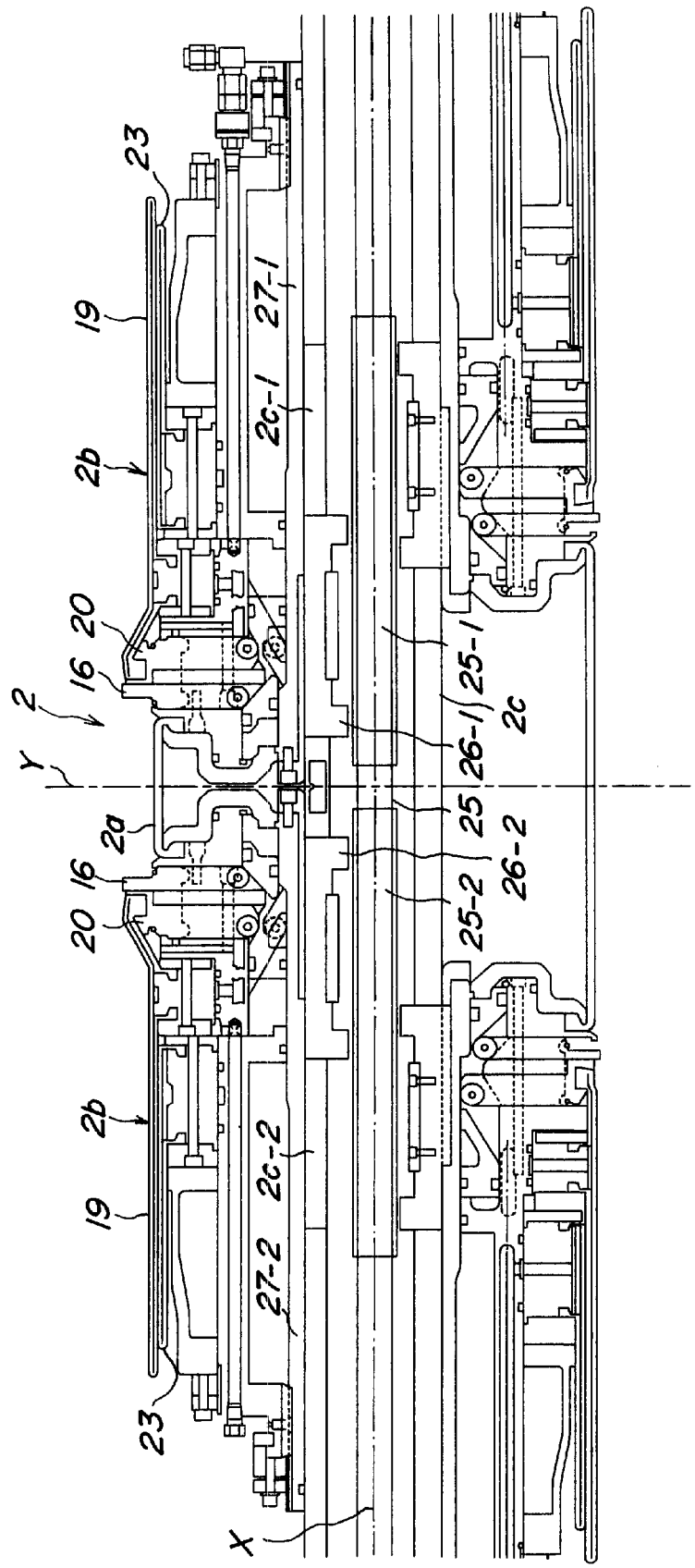
FIG. 12 is a sectional view showing the second drum of FIG. 4.

The structure and function of a preferred embodiment of the second drum 2 for building green tires at the second building stage will be explained below with reference to FIGS. 12 to 14. As mentioned above, the second drum 2 is symmetrical with reference to the center plane including a center line Y which intersects with the common axis X. The upper half of FIG. 12 shows the second drum 2 in its position where the width has been decreased to the minimum width, and the lower half of FIG. 12 shows the second drum 2 in its position where the width has been increased to the maximum width. The rotational shaft 2c of the second drum 2 is hollow and accommodates therein feed screw 25 provided with a right-hand screw portion 25-1 and a left-hand screw portion 25-2 which are arranged on opposite sides with reference to the center plane.

Figure 13:
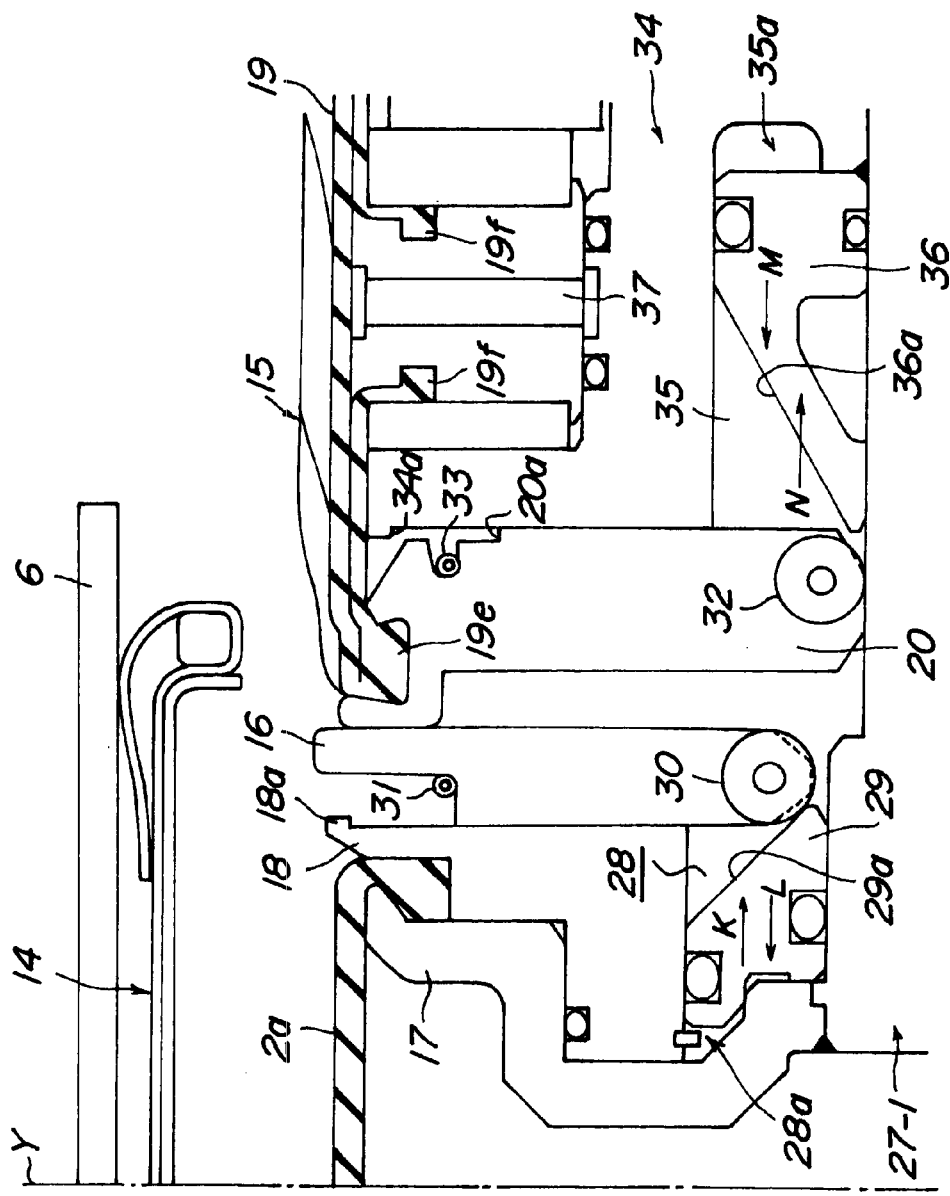

With reference to FIGS. 12 and 13, a pair of carriers 26-1 and 26-2 are threadedly engaged with the right-hand screw portion 25-1 and the left-hand screw portion 25-2 of the feed screw 25, respectively. These carriers 26-1, 26-2 are slidably engaged with a plurality of longitudinal slits 2c-1, 2c-2 formed in the rotational shaft 2c, and serve to carry outer cylinders 27-1, 27-2 which are slidably engaged with the outer surface of the rotational shaft 2c. The inner rings 17 of the center drum body 2a are fixedly secured to the outer cylinders 27-1, 27-2. The width of the center drum body 2a can be adjusted by rotating the feed screw in a desired direction and by a desired angular amount.

The bladder of the center drum body 2a is tightly clamped between the outer peripheral portion of the inner ring 17 and the outer peripheral portion of the outer ring 18 which is fixedly secured to the inner ring 17. It is assumed that pressurized gas can be supplied to, and exhausted from the bladder through a fluid passage which is shown only partly.

A cylinder 28 is formed by the inner peripheral surface of the outer ring 18 and the outer peripheral surface of the corresponding outer cylinder 27-1, 27-2. The cylinder 28 extends in the axial direction, and serves to slidably accommodate a piston 29 therein. The cylinder 28 and the piston 29 define a pressure chamber 28a on that side of the piston 29 which is close to the center plane of the drum body 2a. The pressure chamber 28a is connected to the passage for supplying or exhausting pressurized gas. When the pressure chamber 28a is supplied with pressurized gas, the piston is moved axially as shown by arrow K. On the side remote from the center plane of the drum body 2a, the piston 29 has a cam surface 29a of substantially truncated-conical shape.

The centering element 16 is comprised of a plurality of segments which are successively arranged in the circumferential direction. Each segment of the centering element 16 has a radially inner end provided with a roller 30 which is in rolling engagement with the cam surface of the piston 29. The segments on their radially outer ends are engaged by an annular tension spring 31 which is arranged in the circumferential direction of the centering element 16. The tension spring 31 serves to retract the segments radially inwards, i.e., toward the axis X. Thus, when the pressurized gas is supplied to the pressure chamber 28a, the piston 29 is moved in the direction indicated by arrow K so that the segments are moved radially outwards, due to the engagement of the cam surface 29a and the rollers 30. When, on the other hand, the pressurized gas is exhausted from the pressure chamber 28a, the resilient force of the tensile spring 31 causes the segments to retract radially inwards while moving the piston 29 in the direction indicated by arrow L. In order to achieve a smooth radial sliding movement of the segments forming the centering element 16, the side surface of the outer ring 18 remote from the center plane of the drum body 2a and the opposite side surface of the lock element 20 are slidably engaged with each other as the guide surfaces. The maximum diameter of the centering element 16 is defined by a stopper 18a which is provided for the outer ring 18.

The lock element 20, which clamps the folded end 19e of the outer side bladder section 19, is comprised of a plurality of segments which are successively arranged in the circumferential direction. As is the case with the centering element 16, the segments of the lock element 20 are provided with respective rollers 32 at their radially inner ends, and an annular tension spring 33 which is arranged in the circumferential direction of the lock element 20. The radial sliding movement of the segments of the lock element 20 are guided by the outer side surfaces of the segments of the centering element 16 and the opposite side surface of the guide member 34 which is secured to the outer peripheral surface of the corresponding outer cylinder 27-1, 27-2

A cylinder 35 is formed by the inner peripheral surface of the guide member 34 and the outer peripheral surface of the corresponding outer cylinder 27-1, 27-2. The cylinder 35 extends in the axial direction, and serves to slidably accommodate a piston 36 therein. The cylinder 35 and the piston 36 define a pressure chamber 35a on that side of the piston 36 which is remote from the center plane of the drum body 2a. The pressure chamber 35a is connected to the passage for supplying or exhausting pressurized gas. On the side close to the center plane of the drum body 2a, the piston 36 has a cam surface 36a of substantially truncated-conical shape. Thus, when the pressurized gas is supplied to the pressure chamber 35a, the piston 36 is moved in the direction indicated by arrow M so that the segments are moved radially outwards, due to the engagement of the cam surface 36a and the rollers 32. When, on the other hand, the pressurized gas is exhausted from the pressure chamber 35a, the resilient force of the tensile spring 33 causes the segments to retract radially inwards while moving the piston 36 in the direction indicated by arrow N. The maximum diameter thereof, is defined by engagement of a recess 20a in the lock element 20 with the corresponding shoulder 34a which is provided for the guide member 34. By defining the maximum diameter of the lock element 20, it is possible to optimize the pressure with which the lock element 20 is urged against the inner peripheral surface 14Bi of the bead portion 14B (FIG. 7).

The guide member 34 serve to support retainer rings for fixedly supporting the side bladder sections 19, 23 at their legs 19f. The retainer rings are provided therein with passages 37 for supplying and exhausting pressurized gas to and from the side bladder sections 19, 23. When the side bladder sections 19, 23 are supplied with the pressurized gas, they are permitted to undergo inflation radially outwards, without expanding radially inwards. Incidentally, FIG. 14 shows a state in which the pistons 29, 36 have been moved in the directions of arrows K and N, respectively, so that the centering element 16 and the lock element 20 are expanded radially outwards.

In order to evaluate advantageous effects of the present invention, tests have been conducted in which there were produced green tires for passenger car radial tires with rim diameters of 15 inches and 16 inches, aspect ratios of 50 and 55, and including a two-layer carcass ply, by the method according to the present invention as explained with reference to FIGS. 1 to 14, by a conventional method I in which the tread rubber member is obtained by extrusion integrally with mini-sidewall rubber members, and by another conventional method II which does not use mini-sidewall rubber members. The numbers of green tires produced by these methods in eight hours were counted and indicated as indices wherein 100 is the green tire production index by the conventional method I. The index according to the conventional method II was 67, whereas the index according to the method of the present invention is 115. It has been clearly confirmed that the present invention provides an improved productivity which is higher by 15% as compared even to the conventional method I in which mini-sidewall rubber members are applied.

It will be appreciated from the foregoing description that, according to the present invention, it is possible to produce a green tire which effectively prevents occurrence of cracks by arranging the radially outer regions of the sidewall rubbers on the outer sides of the tread rubber, to maintain a high productivity of the tread rubber extrusion process, to significantly improve the productivity of green tire building by achieving well balanced cycle time required for the first and second building stages while reducing the total cycle time, to utilize existing manufacturing system with minimized investment for the partial modification of the second drum, and to readily change the specification of tires to be produced.

While the present invention has been described above with reference to a preferred embodiment, it has been presented by way of example only, and various changes and/or modifications may be made without departing from the scope of the invention as defined by the appended claims.

What is claimed is:

1. A method for manufacturing pneumatic tires comprising the steps of:

forming on a first drum a green case in which a carcass ply member and a pair of bead core members are joined together, and holding and moving the green case by a transfer device to a position around a second drum;

expanding a pair of centering elements radially outwards from the second drum and positioning the centering elements with reference to opposite inner sides of a pair of bead portions located at stepped regions of said green case while on said second drum, said bead portions being folded radially inwards relative to the bead core members of the green case held by the transfer device, and then moving the centering elements in opposite directions and thereby urging the centering elements against the opposite inner sides of the bead portions; said centering elements being radially expandable between the second drum and the respective side bladders, and axially movable in opposite directions, and wherein said centering elements are expanded so that a clearance is always formed between radially outer most ends of the centering elements and an inner peripheral surface of the green case;

expanding a pair of lock elements on an axially outer side of the centering elements and urging the lock elements against inner peripheral surfaces of the bead portions so as to fixedly secure the green case to the second drum;

subsequently releasing the green case from the transfer device;

causing the second drum to expand and undergo a width reduction, thereby expanding the green case into a toroidal shape; and joining sidewall rubber members to said toroidal green case to thereby form a green tire, said sidewall rubber members being wound on a pair of side bladders on the outer side of the lock elements and joined to said toroidal green case by inflating said side bladders.

2. The method according to claim 1, wherein said second drum comprises an expandable center drum body having an adjustable width, said pair of side bladders being situated adjacent to said drum body with said centering elements therebetween, and wherein said green case is held in place by accommodating said drum body and said centering elements within said green case between the opposite inner sides of the bead portions.

3. The method according to claim 1, wherein said side bladders have folded ends which are embedded in, and fixedly secured to said lock elements situated adjacent to said centering elements, and wherein said sidewall rubber members are wound on said side bladders on the sides of the folded ends while said lock elements are in radially retracted positions.

4. The method according to claim 1, wherein a substantially constant length of said sidewall rubber members are automatically wound on said side bladders of the second drum during formation of a green case on said first drum, and said green case is transferred to said second drum by passing over said sidewall rubber members while said lock elements are in radially retracted positions.

5. The method according to claim 1, wherein said sidewall rubber members are each wound on a smooth surface region and a rough surface region of said side bladders.

6. The method according to claim 1, wherein those regions of the lock elements, which are urged against the inner peripheries of the bead portions of the green case, are aligned with the edges of the sidewall rubber members which are situated on folded ends of the side bladders.

7. The method according to claim 1, wherein said side bladders each comprises a first side bladder section for winding said sidewall rubber member thereon, and a second side bladder section situated adjacent to said first side bladder section, and wherein said first and second side bladder sections are sequentially inflated.

8. The method according to claim 1, further comprising the step of joining a belt member and a tread rubber member to each other to form a composite member, said composite member being transferred to a position around said green case which has been fixedly secured to said second drum, and maintained centered with reference to said green case, said green case being radially expanded and urged against, and thereby joined to the composite member, said composite member having side edges which are subsequently folded over, and tightly joined to the green case, and said sidewall rubber members then being joined to side edges of the tread rubber member.

9. The method according to claim 8, wherein said composite member is formed during formation of said green case.

10. An apparatus for manufacturing pneumatic tires, comprising:
- a first drum for forming a green case in which a carcass ply member and a pair of bead core members are joined together:
- a second drum for forming a green tire in which the green case is joined to a belt member, a tread rubber member and sidewall rubber members;
- a transfer device for holding and moving the green case to a position around the second drum;
- a pair of centering elements which are expandable radially outwards from the second drum and adapted to be positioned with reference to opposite inner sides of a pair of bead portions located at stepped regions of said green case while on said second drum, said bead portions being folded radially inward relative to bead core members of the green case held by the transfer device, and also adapted to be moved axially in opposite directions and thereby urged against the opposite inner sides of the bead portions; said centering elements being radially expandable between the second drum and the respective side bladders, and axially movable in opposite directions, and wherein said centering elements are adapted to be expanded so that a clearance is always formed between radially outer most ends of the centering elements and an inner peripheral surface of the green case;
- a pair of lock elements situated on an axially outer side of the centering elements and adapted to be urged against inner peripheral surfaces of the bead portions so as to fixedly secure the green case to the second drum;
- means for causing the second drum to expand and undergo a width reduction after the green case has been released from the transfer device, thereby expanding the green case into a toroidal shape;
- means for joining sidewall rubber members to said toroidal green case to thereby form a green tire, said sidewall rubber members being wound on a pair of side bladders on the outer side of the lock elements and joined to said toroidal green case inflating said side bladders.

11. The apparatus according to claim 10, wherein said second drum comprises an expandable center drum body having an adjustable width, said pair of side bladders being situated adjacent to said drum body with said centering elements therebetween, and wherein said green case is held in position by accommodating said drum body and said centering elements within said green case between the opposite inner sides of the bead portions.

12. The apparatus according to claim 10, wherein said side bladders have folded ends which are embedded in, and fixedly secured to said lock elements situated adjacent to said centering elements, said sidewall rubber members being wound on said side bladders on the sides of the folded ends while said lock elements are in radially retracted positions.

13. The apparatus according to claim 10, further comprising means for automatically winding a substantially constant length of said sidewall rubber members on said side bladders of the second drum during formation of a green case on said first drum, and wherein said transfer device is arranged such that said green case is transferred to said second drum by passing over said sidewall rubber members while said lock elements are in radially retracted positions.

14. The apparatus according to claim 10, wherein said sidewall rubbers are each wound on an outer surface of said side bladders which is comprised of a smooth surface region and a rough surface region.

15. The apparatus according to claim 10, wherein regions of the lock elements, which are urged against the inner peripheries of the bead portions of the green case, are positioned to be aligned with edges of the sidewall rubber members which are situated on folded ends of the side bladders.

16. The apparatus according to claim 10, wherein said side bladders each comprises a first side bladder section for winding said sidewall rubber member thereon, and a second side bladder section situated adjacent to said first side bladder section, said first and second side bladder sections being sequentially inflatable.

17. The apparatus according to claim 10, further comprising:
- a belt/tread drum for forming a composite member in which said belt member and said tread rubber member are joined to each other to form a composite member; and
- a further transfer device for moving the composite member to a position around said green case which has been fixedly secured to said second drum, and holding the composite member centered with reference to said green case;
- said second drum being expandable so that said green case is radially expanded and urged against, and thereby joined to the composite member, said composite member having side edges which are subsequently folded over, and tightly joined to the green case, and said side bladders being operable so that said sidewall rubber members are then joined to side edges of the tread rubber member.

18. The apparatus according to claim 17, wherein said belt/tread drum is operable so that said composite member is formed during formation of said green case.

* * * * *